C. G. SEITZ.
DISK CLUTCH.
APPLICATION FILED SEPT. 24, 1920.
1,415,841.
Patented May 9, 1922.
2 SHEETS—SHEET 2.
Fig. 2.
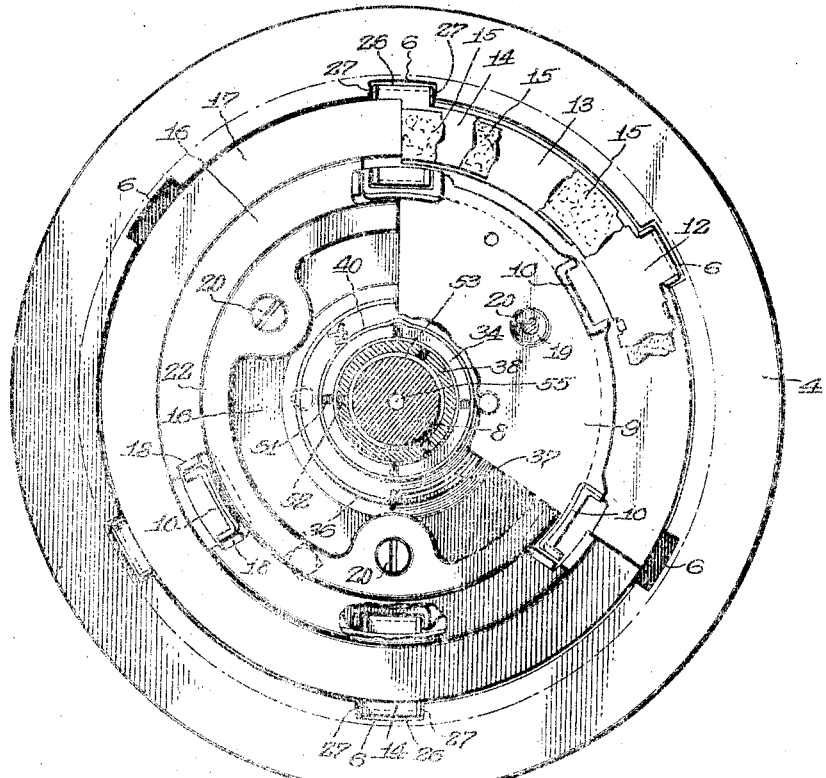
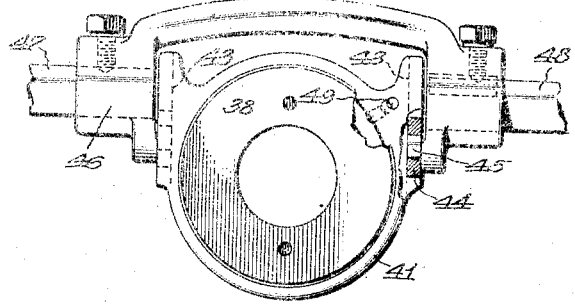
Fig. 3.
INVENTOR
Charles G. Seitz,
BY
ATTORNEYS

UNITED STATES PATENT OFFICE.

CHARLES G. SEITZ, OF DETROIT, MICHIGAN.

DISK CLUTCH.

1,415,841.   Specification of Letters Patent.   Patented May 9, 1922.

Application filed September 24, 1920. Serial No. 412,453.

*To all whom it may concern:*

Be it known that I, CHARLES G. SEITZ, a citizen of the United States of America, residing at Detroit, in the county of Wayne and State of Michigan, have invented certain new and useful Improvements in Disk Clutches, of which the following is a specification, reference being had therein to the accompanying drawings.

This invention relates to multiple disc clutches and has for its object to provide a construction of the discs such as to prevent the looseness and rattling that occurs in many clutches using the discs.

Another object of the invention is to provide a larger bearing surface between the discs and the driven and driving members thus reducing wear.

A further object is to provide for effective lubrication of the interior bearings.

Another is to provide a form of release yoke and bearing that will reduce the pressure required to release the clutch and yet be automatically adjustable to variations of distances between clutch shaft and pedal shaft centers in different makes of transmissions.

In the drawings, I have illustrated one embodiment of my invention of a form suitable for use between the engine and transmission of an automobile, but it will be obvious that many variations in the design and structure of the various elements may be made without departing from the principles of my invention or sacrificing any of its advantages.

Fig. 2 is a front elevation looking in the direction of the arrows at the ends of line II—II in Fig. 1, the shaft being in section;

Fig. 3 is an elevation of the release yoke;

Fig. 4 is an edge view and Fig. 5 a front elevation of the lugs of a modified form of disk;

Fig. 6 is a section through adjacent inner and outer disks having the same form of lug as in Figs. 4 and 5;

Figure 1:
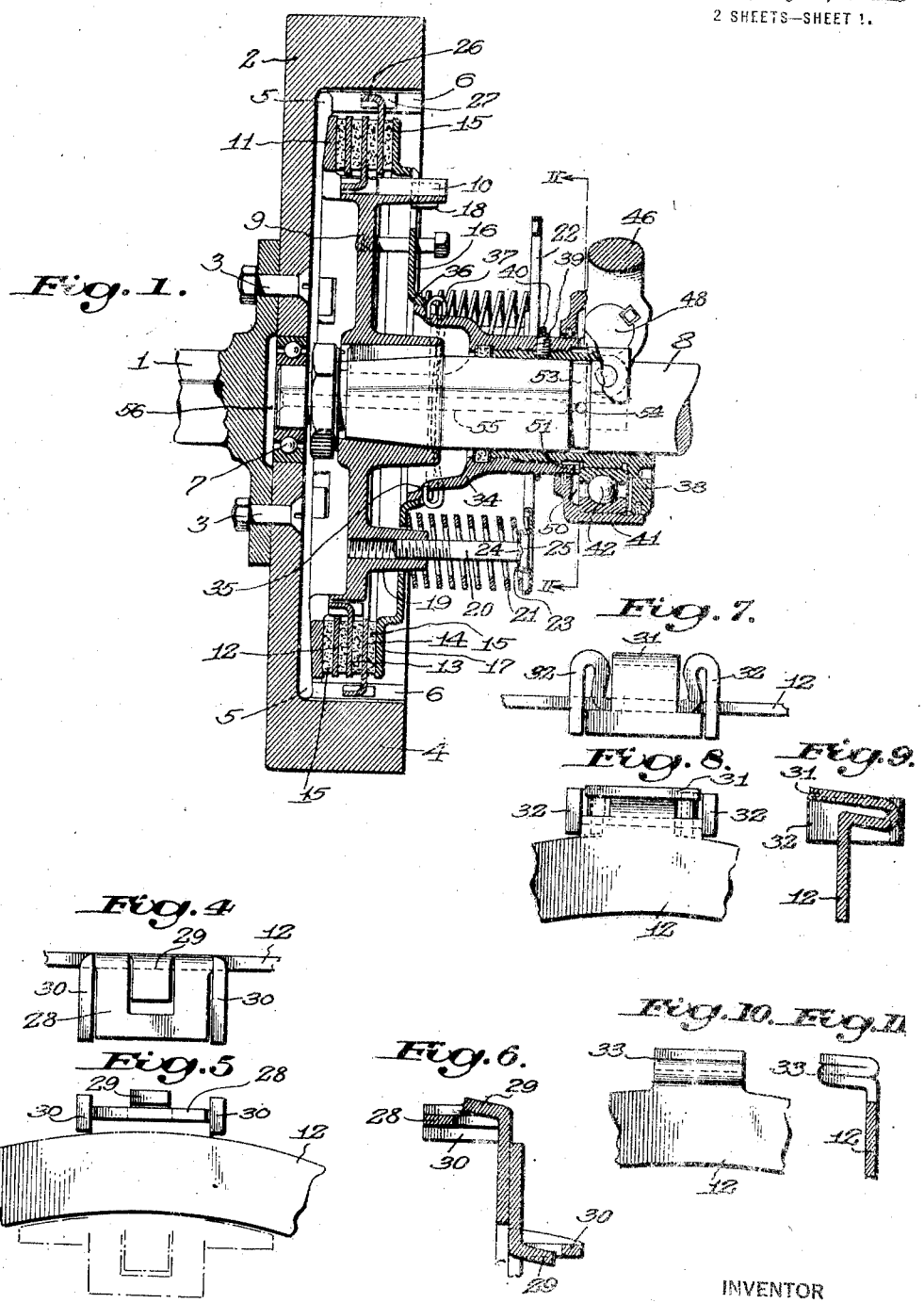
Figure 1 is a longitudinal section of a preferred form of my invention.

Figs. 7, 8, and 9 are edge, front and sectional views respectively of another modification of the lugs, and Figs. 10 and 11 are a side elevation and edge view partly in section of another modification of the lugs.

The driving member or crank shaft 1 has at its end the fly wheel 2 secured by means of bolts 3. The face of the fly wheel remote from the crank shaft is recessed to form an annular rim 4 formed with an undercut groove 5 to facilitate the operation of planing the ways or channels 6, of which six are shown spaced about the inner circumference of the rim 4.

A ball bearing 7 mounted concentrically of the crank shaft supports the end of the clutch shaft 8, to which is keyed the inner drum or disk carrying member 9, shown as a cast metal member having a plurality of ways or channels 10 formed in its outer periphery, and having an outwardly directed flange 11 against which the disks 12, 13, and 14, and the disk facings 15 are pressed by the pressure plate 16. The plate 16 is shown as formed of sheet metal bearing at its flanged periphery 17 against the adjacent packing disks 15, and provided with bent up lugs 18 engaging the sides of the projecting portion of the drum 9 in which lie the channels 10. The drum 9 has bosses 19 internally threaded to receive the spring bolts 20, these bosses being long to permit a considerable amount of adjustment of the screws without danger of the screw projecting beyond the inner face where it could come in contact with the surface of the fly wheel 2 or any projections such as bolt heads or studs used in securing the fly wheel to the flange on the shaft 1 in some types of motors. The tubular boss 19 extends into the interior of the spring 21 and provides a simple way to hold it in place. It is desirable in a clutch of this kind to have the springs as long as possible, but if the springs are too long they will strike the yoke when the clutch is released. By the use of a thin sheet metal lock plate 22, recessed at 23 to receive the head of the spring bolts 20, I take from the spring space only the thickness of the sheet metal of the plate. The plate has a ridge 24 in the bottom of the recess 23 to engage a groove 25 in the bolt head to lock it from rotation.

Each of the disks 12 and 14 consists of an annular plate of sheet metal having a projecting lug 26 bent at substantially right angles to the plane of the plate, the ends of the lug 26 being formed as wings 27 bent to lie in a plane at right angles to the plane of the lug and at right angles to the plane of the disk, extending on both sides of the plane of the disk. These wings bear resiliently against the sides of the ways or channels 6 to prevent lost motion and rattle.

The modification shown in Figs. 4, 5, and 6 has a lug 28 at substantially right angles to the disk, a lug 29 struck up from the central portion of the lug 28 and lying at an angle thereto, and two side lugs or wings 30, 30, both lying on the same side of the plane of the disk. The lug 29 bears either outward against the bottom of the channel 6 in the rim 4, or inward in the intermediate disk to engage the bottom of the channel 10. This gives a resilient bearing radially of the shaft.

In the modification shown in Figs. 7, 8, and 9, the central lug 31 is bent outward and returned upon itself to lie at an angle to the plane of the disk such that the outer end of the lug extends beyond the plane of the edges of the side lugs 32, 32 to engage the bottom of the channel 6 or channel 10 with a resilient bearing. The side lugs 32, 32 are bent to one side of the plane of the disk, then returned on themselves to lie across the plane of the disk. They provide a wide resilient bearing against the sides of the channel 6 or channel 10. In the form shown in Figs. 10 and 11, the projecting lug consists of an extension 33 folded back and forth to provide a wide edge bearing of sufficient thickness to give wearing surface.

As many disks may be used as desired to give enough frictional surface, and the usual friction packing 15 in the form of annular disks of substantially the same size as the body of the disks 12 or 13 may be secured to the sheet metal in any usual or suitable manner.

In assembling, disks with inwardly projecting lugs are made to alternate with disks having outwardly projecting lugs, a layer of packing being interposed if desired. Since the wings 27, 30, or 32 extend transversely of the plane of the disk to provide a wide bearing surface, the ends of these wings might come into contact with each other if the long wings to two adjacent outer disks or two adjacent inner disks lay in the same channels. To avoid this in the present embodiment I form the disks with only two projecting lug formations each, arranged diametrically opposite each other, and set the successive disks in successive channels around the periphery. If six channels are formed in the inner drum for example, or in the rim 4, the first disk would engage two opposite channels, the next similar disk the next two channels to right or left of the first two, and the third disk the remaining two channels so that each channel would have only one lug formation. The fourth disk would then be arranged with its lugs in the same channels as those of the first, but with two similar disks and three of the other set lying between, giving sufficient thickness to provide for a long wing on each disk.

It is obvious that each disk could have more than two lug formations so long as enough channels are provided to permit the staggered arrangement keeping the lugs out of contact with each other. In operative position, the disks are held in contact by the pressure of the springs 21 acting on the pressure plate 16. I provide a pressure plate hub 34, having a flaring end 35 engaging the interior of open boss 36 formed centrally of the pressure plate 16, and held yieldably thereto by a spring 37 engaging holes in the boss and in the flaring end. This loose joint provides for unequal wear of the metal disks or for irregularities in the thickness of the fiber washers 15. The pressure plate hub 34 is internally threaded to receive the release bearing sleeve 38, a set screw 39 holding the hub and sleeve in their position of proper adjustment. A wire may be used as shown at 40 to hold the screw from working loose.

A release bearing retainer 41 surrounds the sleeve 38 and encloses the ball bearing 42. At opposite sides of the member 41 are channels 43 in which the guide blocks 44 are slidably mounted, and these guide blocks have bearings engaged by the trunnions 45 on the release yoke 46, secured to the shafts 47, 48, and operated in the usual manner.

It will be noted that the yoke trunnions 45 in the blocks 44 lie above the center of the release bearing and the shorter lever arm thus afforded reduces the pressure required on the clutch pedal to release the clutch. The distance from the clutch shaft center to the release yoke center varies in various cars with different forms of transmission, but this mounting of the yoke trunnions in sliding blocks will take care of a considerable variation with little change in the pressure used on the foot pedal.

The lubricating system provided for the bearings of my clutch comprises an oil opening 49 in the release bearing retainer 41 having a duct leading to the chamber 50 which communicates through ports 51 in the pressure plate hub 34 and ports 52 in the release bearing sleeve 38 with an annular channel 53 formed in the clutch shaft 8. A radial hole 54 leads from the channel 53 to the axial duct 55 which extends through the shaft 8 to the chamber 56 so that the bearing 7 will receive oil introduced at the opening 49.

While I have described and illustrated the present embodiment of my invention in a form suitable for use in an automobile, the driving and driven members may be arranged and made effective in a brake assembly, the driving member and driving disks being retarding members of the brake, and the driven member and driven disks being the retarded members of the brake assembly.

It will readily be understood that changes and modifications may be found desirable or essential in meeting the various exigencies of use, and I desire to be understood as reserving the right to make any and all such changes or modifications in so far as they may fall within the spirit and scope of the invention as defined in the following claims when broadly construed.

I claim:

1. A clutch comprising a driving member, a clutch shaft coaxial with the driving member and having a bearing therein, a drum secured to the clutch shaft and having a flange adjacent to the driving member, a series of clutch disks mounted on the drum, and having radially projecting lugs, the lugs of successive disks engaging alternately with channels in the drum and in the driving member, a clamping plate connected to the driven member and arranged to bear against the disks, bosses on the drum extending through the clamping plate and receiving the ends of spring bolts, a lock plate engaging the heads of the bolts, and springs surrounding the bolts and bosses and bearing against the locking plate and against the clamping plate to force the latter into contact with the end of the series of clutch disks, to clamp them yieldingly between the clamping plate and the flange on the drum.

2. In a clutch, a clutch shaft, a drum secured to the clutch shaft and having a flange, a driving member surrounding the drum, a series of disks bearing against the flange and alternately engaging the driving member and the drum, a clamping plate for pressing the disks into frictional engagement, a hub having a flaring end portion having its outer surface adjacent to its extremity of a substantially spherical configuration, said clamping plate being adapted to encircle said hub and having the portion thereof in contact with the hub shaped to correspond with the curvature of the outer surface of the end portion of the hub whereby the hub has a universal joint connection with the clamping plate, spring means operatively connected with the drum and bearing against the clamping plate, and means operatively connected with the hub to withdraw the clamping plate from clamping engagement with the disks.

3. A friction disk for clutches consisting of an annular body of sheet metal having a radially projecting lug, a portion of the lug being bent at an angle to the body, and another portion being bent to lie adjacent to the edge of the first portion to provide a wider bearing surface.

4. A friction disk for clutches consisting of an annular body of sheet metal having a radially projecting lug, a portion of the lug being bent at an angle to the body, and another portion bent to form a wing lying at right angles to the plane of the lug.

5. A friction disk for clutches consisting of an annular body of sheet metal having a radially projecting lug, a portion of the lug being bent at an angle to the body, another portion being bent to lie adjacent to the first portion to form a wider bearing surface, and a third portion inclined to the plane of the first portion and having its end extending to a greater radial distance from the body than the edges of the second portion.

6. A clutch comprising a member having a channel formed therein parallel with its axis, and a friction disk having a radially projecting lug lying within the channel, the lug having a pair of wings lying transversely to the plane of the disk and adapted to bear resiliently against the sides of the channel.

7. A clutch comprising a member having a channel formed therein parallel with its axis, and a friction disk having a radially projecting lug lying within the channel, the lug having a portion extending at an angle to the plane of the disk and adapted normally to bear resiliently against the bottom of the channel.

8. A clutch comprising a member having a channel formed therein parallel with its axis, and a friction disk having a radially projecting lug lying within the channel, the lug having a portion bent at right angles to the plane of the disk and having a pair of wings lying transversely to the plane of the disk with their outer faces bearing against the sides of the channel, the wings having their inner faces adjacent to the edges of the angularly bent portion.

9. A structure as in claim 8 in which the lug has a portion extending radially beyond the edges of the wings to engage the bottom of the channel.

10. In a clutch, a clutch shaft, a drum secured to the clutch shaft and having a flange, a driving member surrounding the drum, a series of disks bearing against the flange and alternately engaging the driving member and the drum, a clamping plate having a flanged periphery bearing against the end of the series of disks, the plate having a central open boss, the material near the periphery of the central opening having substantially the configuration of a portion of a sphere, a hub having the exterior of its end portion shaped to correspond with the interior of the central portion of the boss on the plate to form a universal joint connection with the boss on the clamping plate, and means operatively connected with the hub to withdraw the clamping plate from clamping engagement with the disks.

11. In a clutch, a clutch shaft, a drum secured to the clutch shaft, a driving member, a plurality of disks having resilient rings, the drum and the driving member each having portions parallel to the axis of the shaft adapted to engage with wings on some of the disks, the wings extending transversely of the plane of the disks and engaging alternately with the drum and the driving member, the points of engagement of the disks with the drum and with the driving member being spaced angularly a sufficient distance to avoid interference.

12. A clutch comprising a driving member and a driven member, a series of friction disks connecting them, a spring-pressed pressure plate to clamp the disks into frictional engagement, a pressure-releasing element operatively engaging said pressure plate, a bearing for said element, a retainer for said bearing, channels in opposite sides of the retainer, guide blocks slidably mounted in the channels, a release yoke having trunnions pivotally mounted in the guide blocks, and means to operate the release yoke.

13. A structure as defined in claim 12, in which the release yoke is mounted to oscillate on an axis parallel with the axis of the trunnions and spaced laterally therefrom.

14. A clutch comprising a member having a plurality of channels formed therein parallel with its axis, a series of friction disks each having a plurality of projecting lugs, the lugs of each disk having portions projecting transversely to the plane of the disk to a point beyond the plane of the adjacent disk, the number of channels in the clutch member being a multiple of the number of lugs on a disk and the lugs of adjacent disks being placed in different channels.

In testimony whereof I affix my signature in presence of two witnesses.

CHARLES G. SEITZ.

Witnesses:
O. F. BARTHEL,
MARY ALBIETY.